(12) United States Patent
Mellott, II et al.

(10) Patent No.: US 7,705,068 B2
(45) Date of Patent: Apr. 27, 2010

(54) POLYURETHANE DISPERSIONS IN AN AQUEOUS ASPHALT EMULSION

(75) Inventors: Joseph W. Mellott, II, Stow, OH (US); Jason D. Smith, Strongsville, OH (US)

(73) Assignee: The Garland Company, Inc., Cleveland, OH (US)

( * ) Notice: Subject to any disclaimer, the term of this patent is extended or adjusted under 35 U.S.C. 154(b) by 230 days.

(21) Appl. No.: 11/899,443

(22) Filed: Sep. 6, 2007

(65) Prior Publication Data
US 2009/0069460 A1    Mar. 12, 2009

(51) Int. Cl.
*C08K 3/00*    (2006.01)
(52) U.S. Cl. .......................................... 523/122; 524/60
(58) Field of Classification Search .................. 523/122; 524/60
See application file for complete search history.

(56) References Cited

U.S. PATENT DOCUMENTS

| | | | |
|---|---|---|---|
| 3,909,474 A | 9/1975 | Borchert | |
| 3,932,331 A | 1/1976 | Doi et al. | |
| 4,724,245 A * | 2/1988 | Lalanne et al. | 524/61 |
| 5,104,938 A * | 4/1992 | Toyama et al. | 525/92 C |
| 2005/0124736 A1 | 6/2005 | Bonnet et al. | |

FOREIGN PATENT DOCUMENTS

| | | |
|---|---|---|
| DE | 4039151 | 6/1992 |
| DE | 4408154 | 9/1995 |

* cited by examiner

*Primary Examiner*—Robert D. Harlan
(74) *Attorney, Agent, or Firm*—Fay Sharpe LLP; Brian E. Turung

(57) ABSTRACT

The invention relates to liquid compositions that include an aqueous asphalt mixture and polyurethane dispersion. The polyurethane dispersion includes a polyurethane that is based on an aliphatic polyol backbone based on polytetramethyl ethylene glycol and/or polycaprolactone. The aqueous asphalt mixture in the liquid composition generally constitutes a majority volume percent of the liquid composition. The polyurethane dispersion generally constitutes at least about 0.1 volume percent of said liquid composition.

30 Claims, 2 Drawing Sheets

POLYURETHANE DISPERSIONS IN AN AQUEOUS ASPHALT EMULSION

The present invention relates to asphalt emulsions, particularly to asphalt emulsions that are modified by an aqueous dispersion of a polyurethane.

The use of asphalt-polymer blends is well known in the art. Such asphalt-polymer blends are used on road surfaces, structural waterproofing materials and the like. The incorporation of polymers into asphalts modifies the properties of the asphalt and thereby improves the physical properties of the asphalt (e.g., improved flow (creep) temperature, reduction in the stiffening (cracking) temperature, improved elongation, improved tensile strength, improved tear strength, etc.).

Many of the asphalt polymer blends include the use of a surfactant that is mixed by standard techniques with the asphalt and polymer. Depending on the type of emulsifier used during the preparation of the asphalt emulsion, the asphalt emulsions may be an anionic aqueous emulsion or a cationic aqueous emulsion. Anionic emulsions are commonly used in building and waterproofing applications. In particular, anionic asphalt emulsions are commonly used in roofing membranes. Cationic emulsions are commonly used as a binder in the construction or repair of road pavements.

U.S. Pat. No. 4,724,245, which is incorporated herein, discloses a method that consists of preparing a blend of asphalt and hydroxytelechelic polybutadiene (HTBD), and emulsifying the blend in an aqueous phase and then causing cross-linking to take place by addition of polyisocyanate dispersed in an aqueous phase.

U.S. Pat. No. 3,909,474, which is incorporated herein, discloses a similar method of forming an asphalt as disclosed in the '245 patent. The asphalt used in the '474 patent is a preoxidized asphalt, and the cross-linking is achieved by oxidation of the HTBD.

U.S. Pat. No. 3,932,331, which is incorporated herein, discloses a method for rapidly breaking and hardening an asphalt emulsion by incorporating therein an isocyanate (NCO)-terminated urethane prepolymer.

DE 4039151 discloses a composition obtained by the reaction of a prepolymer with a dispersion of an unsaturated olefin compound, of polyurethane or of asphalt.

DE 4408154 discloses a coating based on an asphalt emulsion containing a polyurethane prepolymer with NCO terminal groups.

Many of the prior art compositions require the use of reactive two-component compositions with the necessary presence of an isocyanate component in order to achieve satisfactory performance.

United States Patent Publication No. 2005/0124736 filed Jun. 9, 2005, which is incorporated herein, discloses an asphalt emulsion based on an aqueous polymer composition equivalent to a non-reactive one-component composition.

SUMMARY OF THE INVENTION

The present invention is an improvement over the formulation disclosed in United States Patent Publication No. 2005/0124736. The polyurethane-asphalt dispersion of the present invention has improved tensile strength and/or peel strength as compared to prior art asphalt emulsions.

In accordance with one non-limiting aspect of the present invention, there is provided a polyurethane-asphalt dispersion that includes at least one aqueous asphalt mixture and at least one polyurethane dispersion, which polyurethane dispersion is at least partially based on polytetramethyl ethlene glycol (PTMEG) and/or polycaprolactone. The aqueous asphalt mixture constitutes a majority volume percent of the polyurethane-asphalt dispersion. In one non-limiting embodiment of the invention, the polyurethane-asphalt dispersion includes at least about 60 volume percent of the aqueous asphalt mixture. In one non-limiting aspect of this embodiment of the invention, the polyurethane-asphalt dispersion includes at least about 80 volume percent of the aqueous asphalt mixture. In another non-limiting aspect of this embodiment of the invention, the polyurethane-asphalt dispersion includes about 90-99.8 volume percent of the aqueous asphalt mixture. In still another non-limiting aspect of this embodiment of the invention, the polyurethane-asphalt dispersion includes about 90-99 volume percent of the aqueous asphalt mixture. In another and/or alternative non-limiting embodiment of the invention, the polyurethane dispersion constitutes at least about 0.1 volume percent of the polyurethane-asphalt dispersion. In one non-limiting aspect of this embodiment, the polyurethane dispersion constitutes at least about 0.2 volume percent of the polyurethane-asphalt dispersion. In another non-limiting aspect of this embodiment, the polyurethane dispersion constitutes at least about 0.4 volume percent of the polyurethane-asphalt dispersion. In still another non-limiting aspect of this embodiment, the polyurethane dispersion constitutes about 0.5-40 volume percent of the polyurethane-asphalt dispersion. In yet another non-limiting aspect of this embodiment, the polyurethane dispersion constitutes about 0.8-20 volume percent of the polyurethane-asphalt dispersion. In still yet another non-limiting aspect of this embodiment, the polyurethane dispersion constitutes about 1-10 volume percent of the polyurethane-asphalt dispersion. The polyurethane-asphalt dispersion of the present invention can be used in a number of different applications such as, but not limited to, roof coatings, roof membranes, waterproof coatings, coatings used with road surfaces, protective coatings for various types of materials, etc. The polyurethane-asphalt dispersion of the present invention can be dried/set in ambient conditions (e.g., outside), or be heated and/or air dried in a manufacturing facility that manufactures prefabricated roofing products, building products, prefabricated coatings on materials, etc.

In accordance with another non-limiting aspect of the present invention, the aqueous asphalt mixture includes a majority volume percent asphalt emulsion. Many different asphalt emulsions can be used such as, but not limited to, an anionic asphalt emulsion SS1h. The asphalt emulsion generally constitutes at least about 55 volume percent of the aqueous asphalt mixture. In one non-limiting composition of the aqueous asphalt mixture, the asphalt emulsion constitutes about 55-95 volume percent of the aqueous asphalt mixture. In another non-limiting composition of the aqueous asphalt mixture, the asphalt emulsion constitutes about 65-90 volume percent of the aqueous asphalt mixture. In still another non-limiting composition of the aqueous asphalt mixture, the asphalt emulsion constitutes about 75-85 volume percent of the aqueous asphalt mixture. In yet another non-limiting composition of the aqueous asphalt mixture, the asphalt emulsion constitutes about 80-85 volume percent of the aqueous asphalt mixture. The asphalt emulsion generally includes about 50-90 weight percent bitumen and/or coal tar, 10-50 weight percent emulsion, and 0.01-15 weight percent water; and typically about 50-70 weight percent asphalt, 30-50 weight percent emulsion, and 0.1-10 weight percent water; however, other compositions of the asphalt emulsion can be used. The aqueous asphalt mixture also includes one or more other components such as, but not limited to, latex emulsion, biocide, thickener, surfactant, defoamer, and/or organic solvent. In one non-limiting embodiment of the invention, the aqueous asphalt mixture includes latex emulsion. Many different types of latex emulsions can be used such as, but not limited to, SBR latex emulsion which is commercially available from Momentum Technologies as A-1507. In one non-limiting composition of the aqueous asphalt mixture, the latex emulsion, when used, constitutes at least about 1 volume percent of the aqueous asphalt mixture. In another non-limiting composition of the aqueous asphalt mixture, the latex emulsion, when used, constitutes about 5-25 volume percent of the aqueous asphalt mixture. In still another non-limiting composition of the aqueous asphalt mixture, the latex emulsion, when used, constitutes about 8-20 volume percent of the aqueous asphalt mixture. In yet another non-limiting composition of the aqueous asphalt mixture, the latex emulsion, when used, constitutes about 10-18 volume percent of the aqueous asphalt mixture. In still yet another non-limiting composition of the aqueous asphalt mixture, the latex emulsion, when used, constitutes about 12-16 volume percent of the aqueous asphalt mixture. In another or alternative non-limiting embodiment of the invention, the aqueous asphalt mixture includes biocide. Many different types of biocide can be used such as, but not limited to, Polyphase EC17, Nuocept 95, Polyphase 186, and/or the like. In one non-limiting composition of the aqueous asphalt mixture, the biocide, when used, constitutes at least about 0.05 volume percent of the aqueous asphalt mixture. In another non-limiting composition of the aqueous asphalt mixture, the biocide, when used, constitutes about 0.1-2 volume percent of the aqueous asphalt mixture. In still another non-limiting composition of the aqueous asphalt mixture, the biocide, when used, constitutes about 0.1-1.5 volume percent of the aqueous asphalt mixture. In yet another non-limiting composition of the aqueous asphalt mixture, the biocide, when used, constitutes about 0.15-1 volume percent of the aqueous asphalt mixture. In yet another non-limiting composition of the aqueous asphalt mixture, the biocide, when used, constitutes about 0.2-0.6 volume percent of the aqueous asphalt mixture. In still another or alternative non-limiting embodiment of the invention, the aqueous asphalt mixture includes thickener. Many different types of thickener can be used such as, but not limited to, Texapol 63-510, Texapol 63-508, Texapol 63-002 and/or the like. In one non-limiting composition of the aqueous asphalt mixture, the thickener, when used, constitutes at least about 0.1 volume percent of the aqueous asphalt mixture. In another non-limiting composition of the aqueous asphalt mixture, the thickener, when used, constitutes about 0.1-5 volume percent of the aqueous asphalt mixture. In still another non-limiting composition of the aqueous asphalt mixture, the thickener, when used, constitutes about 0.5-3 volume percent of the aqueous asphalt mixture. In yet another non-limiting composition of the aqueous asphalt mixture, the thickener, when used, constitutes about 1-3 volume percent of the aqueous asphalt mixture. In still yet another non-limiting composition of the aqueous asphalt mixture, the thickener, when used, constitutes about 1.1-2 volume percent of the aqueous asphalt mixture. In yet another or alternative non-limiting embodiment of the invention, the aqueous asphalt mixture includes surfactant. Many different types of surfactant can be used, + such as, but not limited to, Glycol Ether EB, Triton X-100, Surfonic N100 and/or the like. In one non-limiting composition of the aqueous asphalt mixture, the surfactant, when used, constitutes at least about 0.01 volume percent of the aqueous asphalt mixture. In another non-limiting composition of the aqueous asphalt mixture, the surfactant, when used, constitutes about 0.05-5 volume percent of the aqueous asphalt mixture. In still another non-limiting composition of the aqueous asphalt mixture, the surfactant, when used, constitutes about 0.08-3 volume percent of the aqueous asphalt mixture. In yet another non-limiting composition of the aqueous asphalt mixture, the surfactant, when used, constitutes about 0.1-2 volume percent of the aqueous asphalt mixture. In still yet another non-limiting composition of the aqueous asphalt mixture, the surfactant, when used, constitutes about 0.1-1 volume percent of the aqueous asphalt mixture. In another non-limiting composition of the aqueous asphalt mixture, the surfactant, when used, constitutes about 0.1-1 volume percent of the aqueous asphalt mixture. In still yet another or alternative non-limiting embodiment of the invention, the aqueous asphalt mixture includes organic solvent. Many different types of organic solvent can be used, such as, but not limited to, mineral spirits and the like. In one non-limiting composition of the aqueous asphalt mixture, the organic solvent, when used, constitutes at least about 0.01 volume percent of the aqueous asphalt mixture. In another non-limiting composition of the aqueous asphalt mixture, the organic solvent, when used, constitutes about 0.05-10 volume percent of the aqueous asphalt mixture. In still another non-limiting composition of the aqueous asphalt mixture, the organic solvent, when used, constitutes about 0.1-5 volume percent of the aqueous asphalt mixture. In yet another non-limiting composition of the aqueous asphalt mixture, the organic solvent, when used, constitutes about 0.2-3 volume percent of the aqueous asphalt mixture. In still yet another non-limiting composition of the aqueous asphalt mixture, the organic solvent, when used, constitutes about 0.3-2 volume percent of the aqueous asphalt mixture. In another non-limiting composition of the aqueous asphalt mixture, the organic solvent, when used, constitutes about 0.4-1 volume percent of the aqueous asphalt mixture. In another or alternative non-limiting embodiment of the invention, the aqueous asphalt mixture includes defoamer. Many different types of defoamer can be used such as, but not limited to, DEEFO 97-3, DEEFO 3000, DEEFO PI-35 and/or the like. In one non-limiting composition of the aqueous asphalt mixture, the defoamer, when used, constitutes at least about 0.01 volume percent of the aqueous asphalt mixture. In another non-limiting composition of the aqueous asphalt mixture, the defoamer, when used, constitutes about 0.05-5 volume percent of the aqueous asphalt mixture. In still another non-limiting composition of the aqueous asphalt mixture, the defoamer, when used, constitutes about 0.1-3 volume percent of the aqueous asphalt mixture. In yet another non-limiting composition of the aqueous asphalt mixture, the defoamer, when used, constitutes about 0.1-2 volume percent of the aqueous asphalt mixture. In still yet another non-limiting composition of the aqueous asphalt mixture, the defoamer, when used, constitutes about 0.1-1 volume percent of the aqueous asphalt mixture. In another non-limiting composition of the aqueous asphalt mixture, the defoamer, when used, constitutes about 0.1-0.5 volume percent of the aqueous asphalt mixture. In still another or alternative non-limiting embodiment of the invention, the aqueous asphalt mixture can include additional amounts of water. In one non-limiting composition of the aqueous asphalt mixture, water, excluding the amount of water in the asphalt emulsion or other components of the asphalt mixture, is added in an amount up to about 2 volume percent of the aqueous asphalt mixture. In another non-limiting composition of the aqueous asphalt mixture, water, excluding the amount of water in the asphalt emulsion or other components of the asphalt emulsion, is added in an amount of about 0.1-1 volume percent of the aqueous asphalt mixture.

In accordance with yet another non-limiting aspect of the present invention, the polyurethane dispersion at least partially includes an aliphatic polyol backbone based on polytetramethyl ethlene glycol (PTMEG) and/or polycaprolactone. In one non-limiting embodiment of the invention polyurethane dispersion includes a majority weight percent of an aliphatic polyol backbone based on polytetramethyl ethlene glycol (PTMEG) and/or polycaprolactone. In another and/or alternative non-limiting embodiment of the invention, the polyurethane dispersion includes about 55-100 weight percent of a polyurethane that is based on a backbone of polytetramethyl ethlene glycol (PTMEG) and/or polycaprolactone. In still another non-limiting embodiment of the invention, the polyurethane dispersion includes about 60-100 weight percent of a polyurethane that is based on a backbone of polytetramethyl ethlene glycol (PTMEG). One non-limiting commercial source of this polyurethane dispersion is Solucote 3092 offered by Soluol. In still another non-limiting embodiment of the invention, the polyurethane dispersion includes about 60-100 weight percent of a polyurethane that is based on a backbone of polycaprolactone. One non-limiting commercial source of this polyurethane dispersion is Solucote 25-191 offered by Soluol.

In accordance with still yet another non-limiting aspect of the present invention, there is provided a method of preparing the polyurethane-asphalt dispersion of the present invention. The method of preparation includes the step of blending the aqueous asphalt mixture with the polyurethane dispersion. The aqueous asphalt mixture and the polyurethane dispersion are compatible with one another, thus can be thoroughly mixed together. The blending of the aqueous asphalt mixture with the polyurethane dispersion can be done prior to the polyurethane-asphalt dispersion being stored in a can or other type of container for later use, or can be blended on site and just prior to use. Blending of the aqueous asphalt mixture with the polyurethane dispersion can be done by a simple mechanical mixer.

One non-limiting object of the present invention is the provision of a polyurethane-asphalt dispersion that includes at least one aqueous asphalt mixture and at least one polyurethane dispersion.

In another and/or alternative non-limiting object of the present invention is the provision of a polyurethane-asphalt dispersion that includes a polyurethane dispersion which at least partially includes an aliphatic polyol backbone based on polytetramethyl ethlene glycol (PTMEG) and/or polycaprolactone.

In still another and/or alternative non-limiting object of the present invention is the provision of a polyurethane-asphalt dispersion that can be easily mixed together.

In yet another and/or alternative non-limiting object of the present invention is the provision of a polyurethane-asphalt dispersion that has improved tensile strength.

In still yet another and/or alternative non-limiting object of the present invention is the provision of a polyurethane-asphalt dispersion that has improved adhesion properties.

These and other advantages will become apparent to those skilled in the art upon the reading and following of this description taken together with the accompanying drawings.

BRIEF DESCRIPTION OF THE FIGURES

Reference may now be made to the drawings, which illustrate various embodiments that the invention may take in physical form and in certain parts and arrangements of parts wherein.

DETAILED DESCRIPTION OF THE INVENTION

Figure 1:
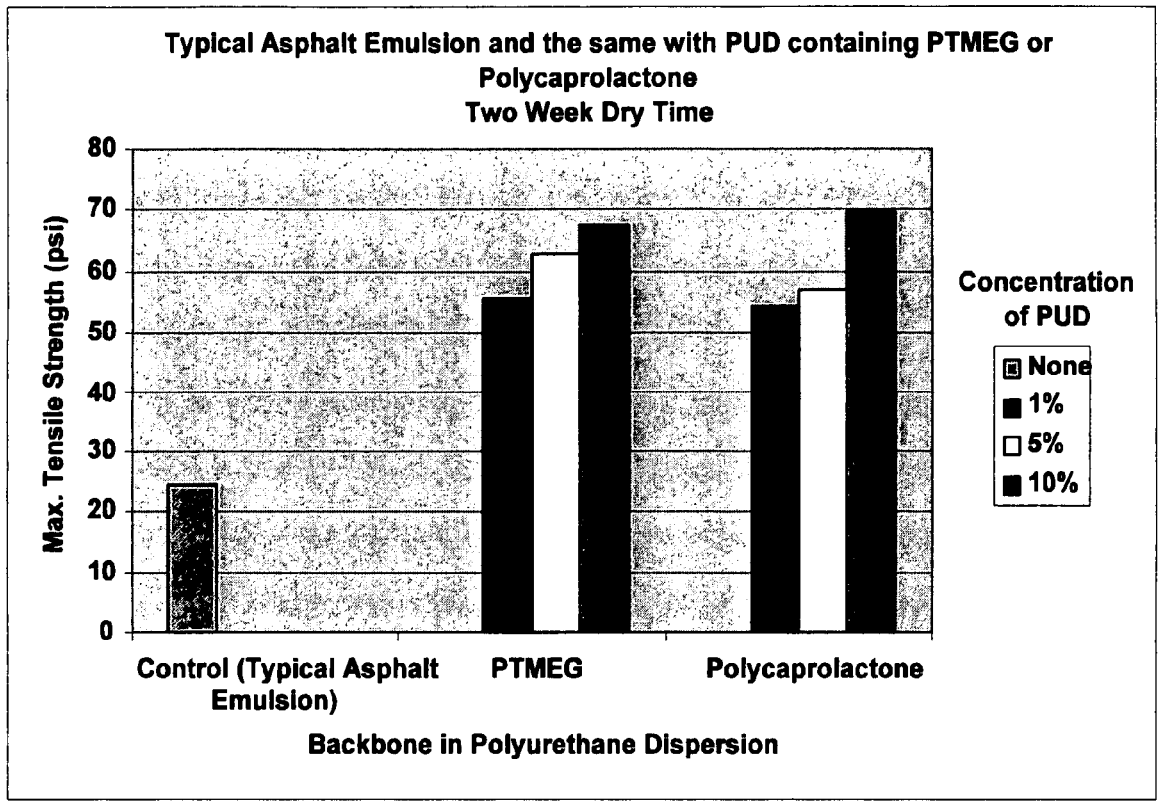
FIG. 1 is a graph illustrating the tensile strength of several different polyurethane-asphalt dispersions in accordance with the present invention; and, FIG. 2 is a graph illustrating the peel strength of several different polyurethane-asphalt dispersions in accordance with the present invention.

Referring now to the drawings wherein the showing is for the purpose of illustrating preferred embodiments of the invention only and not for the purpose of limiting the same, there is provided an improved polyurethane-asphalt dispersion and method for making the same. The improved polyurethane-asphalt dispersion includes at least one aqueous asphalt mixture and at least one polyurethane dispersion, which polyurethane dispersion at least partially includes an aliphatic polyol backbone based on polytetramethyl ethlene glycol (PTMEG) and/or polycaprolactone.

Figure 2:
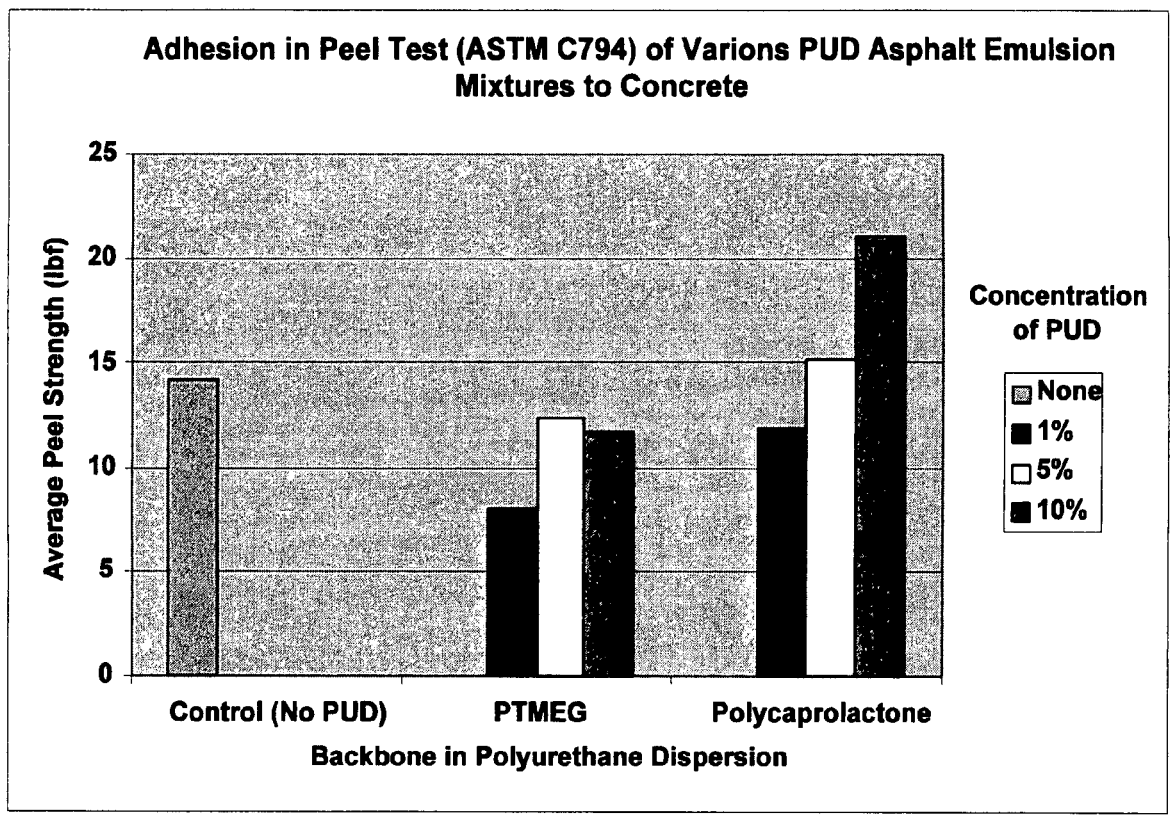

The improved polyurethane-asphalt dispersion exhibits improved tensile strength and peel strength as illustrated in FIGS. 1 and 2. The aqueous asphalt mixture constitutes a majority volume percent of the polyurethane-asphalt dispersion. The polyurethane dispersion constitutes at least about 0.2 volume percent of the polyurethane-asphalt dispersion. The polyurethane-asphalt dispersion of the present invention can be used in a number of different applications such as, but not limited to, roof coatings, roof membranes, waterproof coatings, coatings used with road surfaces, protective coatings for various types of materials, etc. The polyurethane-asphalt dispersion of the present invention can be dried/set in ambient conditions (e.g., outside), or be heated and/or air dried in a manufacturing facility that manufactures prefabricated roofing products, building products, prefabricated coatings on materials, etc. Non-limiting examples of the improved polyurethane-asphalt dispersion of the present inventions in volume percent are set forth as follows:

Example 1

| | |
|---|---|
| Aqueous asphalt mixture | 50.01-99.9% |
| Polyurethane dispersion | 0.1-49.99% |

Example 2

| | |
|---|---|
| Aqueous asphalt mixture | 60-99.5% |
| Asphalt Emulsion | 55-95% |
| Latex emulsion | 5-30% |
| Biocide | 0-5% |
| Thickener | 0-10% |
| Surfactant | 0-5% |
| Organic Solvent | 0-10% |
| Defoamer | 0-5% |
| Water | 0-2% |
| Polyurethane dispersion | 0.5-40% |

Example 3

| | |
|---|---|
| Aqueous asphalt mixture | 70-99% |
| Asphalt Emulsion | 55-95% |
| Latex emulsion | 5-20% |

-continued

| | |
|---|---|
| Biocide | 0.1-1.5% |
| Thickener | 1-5% |
| Surfactant | 0.1-2% |
| Organic Solvent | 0.1-5% |
| Defoamer | 0.1-3% |
| Water | 0.1-1% |
| Polyurethane dispersion | 1-30% |

Example 4

| | |
|---|---|
| Aqueous asphalt mixture | 85-99% |
| Asphalt Emulsion | 75-99% |
| Latex emulsion | 8-18% |
| Biocide | 0.1-1% |
| Thickener | 1-3% |
| Surfactant | 0.1-1% |
| Organic Solvent | 0.1-1% |
| Defoamer | 0.1-1% |
| Water | 0.1-0.5% |
| Polyurethane dispersion | 1-15% |

Example 5

| | |
|---|---|
| Aqueous asphalt mixture | 90-99% |
| Asphalt Emulsion (Anionic asphalt emulsion SS1h) | 82.3% |
| Latex emulsion (SBR latex emulsion A-1507) | 14.7% |
| Biocide (Polyphase EC17) | 0.3% |
| Thickener (Texapol 63-510) | 1.3% |
| Surfactant (Glycol Ether EB) | 0.2% |
| Organic Solvent (Mineral spirits) | 0.6% |
| Defoamer (DEEFO 97-3) | 0.2% |
| Water | 0.4% |
| Polyurethane dispersion (Aliphatic polyol backbone based on PTMEG) | 1-10% |

Example 6

| | |
|---|---|
| Aqueous asphalt mixture | 90-99% |
| Asphalt Emulsion (Anionic asphalt emulsion SS1h) | 82.3% |
| Latex emulsion (SBR latex emulsion A-1507) | 14.7% |
| Biocide (Polyphase EC17) | 0.3% |
| Thickener (Texapol 63-510) | 1.3% |
| Surfactant (Glycol Ether EB) | 0.2% |
| Organic Solvent (Mineral spirits) | 0.6% |
| Defoamer (DEEFO 97-3) | 0.2% |
| Water | 0.4% |
| Polyurethane dispersion (Aliphatic polyol backbone based on polycaprolactone) | 1-10% |

As set forth above in Examples 2-6, the composition of the aqueous asphalt mixture is in weight percent. The method of preparing the polyurethane-asphalt dispersion of the present invention includes the step of blending the aqueous asphalt mixture with the polyurethane dispersion. This mixing can be accomplished by a standard mechanical mixer. The setting of the polyurethane-asphalt dispersion can be accomplished by simple air drying.

Reference is again made to FIGS. 1 and 2. As illustrated in FIG. 1, it was found that increasing the amount of PUD based on PTMEG or Polycaprolactone resulted in increased internal strength of the coating. FIG. 2 illustrates that the inclusion of PUD based on PTMEG has mixed results regarding the adhesive strength to concrete. The use of PUD based on Polycaprolactone increased the adhesive strength to concrete. The adhesion peel test is based on ASTM C 794.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

The invention claimed is:

1. A liquid composition comprising an aqueous asphalt mixture, polyurethane dispersion and at least one component selected from the group consisting of latex emulsion, biocide, thickener, surfactant, organic solvent, defoamer, and water, said aqueous asphalt mixture constituting a majority volume percent of said liquid composition, said polyurethane dispersion constituting about 0.1-10 volume percent of said liquid composition, said polyurethane dispersion including a polyurethane that is based on an aliphatic polyol backbone based on one or more compounds selected from the group consisting of polytetramethyl ethlene glycol and polycaprolactone.

2. The liquid composition as defined in claim 1, wherein said polyurethane dispersion including a majority volume percent of a polyurethane based on an aliphatic polyol backbone based on polytetramethyl ethlene glycol.

3. A liquid composition comprising aqueous asphalt mixture and polyurethane dispersion, said aqueous asphalt mixture comprising 60-99.5 percent by volume of said liquid composition, said polyurethane dispersion comprising 0.4-40 percent by volume of said liquid composition, said polyurethane dispersion including a polyurethane based on an aliphatic polyol backbone, said aliphatic polyol backbone based on one or more compounds selected from the group consisting of polytetramethyl ethlene glycol and polycaprolactone, said polyurethane dispersion includes a majority volume percent of a polyurethane that is based on an aliphatic polyol backbone based on polycaprolactone, said aqueous asphalt mixture comprising by volume percent:

| | |
|---|---|
| Asphalt Emulsion | 55-95% |
| Latex emulsion | 5-30% |
| Biocide | 0-5% |
| Thickener | 0-10% |
| Surfactant | 0-5% |
| Organic Solvent | 0-10% |
| Defoamer | 0-5% |
| Water | 0-2%. |

4. A liquid composition comprising aqueous asphalt mixture and polyurethane dispersion, said aqueous asphalt mixture comprises 70-99 percent by volume of said liquid composition and said polyurethane dispersion comprises 1-30 percent by volume of said liquid composition, said polyurethane dispersion including a polyurethane based on an aliphatic polyol backbone, said aliphatic polyol backbone based on one or more compounds selected from the group consisting of polytetramethyl ethlene glycol and polycaprolactone, said aqueous asphalt mixture comprising by volume percent:

| | |
|---|---|
| Asphalt Emulsion | 55-95% |
| Latex emulsion | 5-20% |
| Biocide | 0.1-1.5% |
| Thickener | 1-5% |
| Surfactant | 0.1-2% |
| Organic Solvent | 0.1-5% |
| Defoamer | 0.1-3% |
| Water | 0.1-1%. |

5. A liquid composition comprising aqueous asphalt mixture and polyurethane dispersion, said aqueous asphalt mixture comprises 85-99 percent by volume of said liquid composition and said polyurethane dispersion comprises 1-15 percent by volume of said liquid composition, said polyurethane dispersion including a polyurethane based on an aliphatic polyol backbone, said aliphatic polyol backbone based on one or more compounds selected from the group consisting of polytetramethyl ethlene glycol and polycaprolactone, said aqueous asphalt mixture comprising by volume percent:

| | |
|---|---|
| Asphalt Emulsion | 75-99% |
| Latex emulsion | 8-18% |
| Biocide | 0.1-1% |
| Thickener | 1-3% |
| Surfactant | 0.1-1% |
| Organic Solvent | 0.1-1% |
| Defoamer | 0.1-1% |
| Water | 0.1-0.5%. |

6. The liquid composition as defined in claim 4, wherein said aqueous asphalt mixture comprises 90-99 percent by volume of said liquid composition and said polyurethane dispersion comprises 1-10 percent by volume of said liquid composition, said polyurethane dispersion including a polyurethane based on an aliphatic polyol backbone based on polytetramethyl ethlene glycol, said aqueous asphalt mixture comprising by volume percent:

| | |
|---|---|
| Asphalt Emulsion (Anionic asphalt emulsion SS1h) | 82.3% |
| Latex emulsion (SBR latex emulsion A-1507) | 14.7% |
| Biocide (Polyphase EC17) | 0.3% |
| Thickener (Texapol 63-510) | 1.3% |
| Surfactant (Glycol Ether EB) | 0.2% |
| Organic Solvent (Mineral spirits) | 0.6% |
| Defoamer (DEEFO 97-3) | 0.2% |
| Water | 0.4%. |

7. A liquid composition comprising aqueous asphalt mixture and polyurethane dispersion, said aqueous asphalt mixture comprising 60-99.8 percent by volume of said liquid composition, said polyurethane dispersion comprising 0.2-40 percent by volume of said liquid composition, said aqueous asphalt mixture including asphalt emulsion, emulsion compound and water, said polyurethane dispersion including a polyurethane based on an aliphatic polyol backbone, said aliphatic polyol backbone based on one or more compounds selected from the group consisting of polytetramethyl ethlene glycol and polycaprolactone, said aqueous asphalt mixture includes by volume percent:

| | |
|---|---|
| Asphalt Emulsion | 50-90% |
| Emulsion compound | 10-50% |
| Biocide | 0-5% |
| Thickener | 0-10% |
| Surfactant | 0-5% |
| Organic Solvent | 0-10% |
| Defoamer | 0-5% |
| Water | up to 15%. |

8. The liquid composition as defined in claim 7, wherein said aqueous asphalt mixture includes by volume percent:

| | |
|---|---|
| Asphalt Emulsion | 5-70% |
| Emulsion compound | 30-50% |
| Biocide | 0-5% |
| Thickener | 0-10% |
| Surfactant | 0-5% |
| Organic Solvent | 0-10% |
| Defoamer | 0-5% |
| Water | up to 10%. |

9. The liquid composition as defined in claim 7, wherein said emulsion compound includes latex emulsion, said latex emulsion constituting about 5-25 volume percent of said aqueous asphalt mixture.

10. The liquid composition as defined in claim 8, wherein said emulsion compound includes latex emulsion, said latex emulsion constituting about 5-25 volume percent of said aqueous asphalt mixture.

11. The liquid composition as defined in claim 10, wherein said latex emulsion constituting about 8-20 volume percent of said aqueous asphalt mixture.

12. A liquid composition comprising aqueous asphalt mixture and polyurethane dispersion, said aqueous asphalt mixture comprising 60-99.8 percent by volume of said liquid composition, said polyurethane dispersion comprising 0.2-40 percent by volume of said liquid composition, said aqueous asphalt mixture including asphalt emulsion, emulsion compound and water, said polyurethane dispersion including a polyurethane based on an aliphatic polyol backbone, said aliphatic polyol backbone based on one or more compounds selected from the group consisting of polytetramethyl ethlene glycol and polycaprolactone, said aqueous asphalt mixture includes one or more compounds selected from the group consisting of biocide, thickener, surfactant, organic solvent and defoamer, said biocide, when included in said aqueous asphalt mixture, constituting about 0.1-1.5 volume percent of said aqueous asphalt mixture, said thickener, when included in said aqueous asphalt mixture, constituting about 0.1-5 volume percent of said aqueous asphalt mixture, said surfactant, when included in said aqueous asphalt mixture, constituting about 0.05-1.5 volume percent of said aqueous asphalt mixture, said organic solvent when included in said aqueous asphalt mixture, constituting about 0.05-10 volume percent of said aqueous asphalt mixture, said defoamer, when included in said aqueous asphalt mixture, constituting about 0.05-5 volume percent of said aqueous asphalt mixtures said aqueous asphalt mixture includes by volume percent:

| | |
|---|---|
| Asphalt Emulsion | 50-90% |
| Emulsion compound | 10-50% |
| Biocide | 0-5% |
| Thickener | 0-10% |
| Surfactant | 0-5% |
| Organic Solvent | 0-10% |
| Defoamer | 0-5% |
| Water | up to 15%. |

13. The liquid composition as defined in claim 12, wherein said aqueous asphalt mixture includes biocide.

14. The liquid composition as defined in claim 8, wherein said aqueous asphalt mixture includes biocide.

15. The liquid composition as defined in claim 9, wherein said aqueous asphalt mixture includes biocide.

16. The liquid composition as defined in claim 12, wherein said aqueous asphalt mixture includes thickener.

17. The liquid composition as defined in claim 8, wherein said aqueous asphalt mixture includes thickener.

18. The liquid composition as defined in claim 9, wherein said aqueous asphalt mixture includes thickener.

19. The liquid composition as defined in claim 12, wherein said aqueous asphalt mixture includes surfactant.

20. The liquid composition as defined in claim 8, wherein said aqueous asphalt mixture includes surfactant.

21. The liquid composition as defined in claim 9, wherein said aqueous asphalt mixture includes surfactant.

22. The liquid composition as defined in claim 12, wherein said aqueous asphalt mixture includes organic solvent.

23. The liquid composition as defined in claim 8, wherein said aqueous asphalt mixture includes organic solvent.

24. The liquid composition as defined in claim 9, wherein said aqueous asphalt mixture includes organic solvent.

25. The liquid composition as defined in claim 12, wherein said aqueous asphalt mixture includes defoamer.

26. The liquid composition as defined in claim 8, wherein said aqueous asphalt mixture includes defoamer.

27. The liquid composition as defined in claim 9, wherein said aqueous asphalt mixture includes defoamer.

28. The liquid composition as defined in claim 12, wherein said aqueous asphalt mixture includes by volume percent:

| | |
|---|---|
| Asphalt Emulsion | 5-70% |
| Emulsion compound | 30-50% |
| Biocide | 0-5% |
| Thickener | 0-10% |
| Surfactant | 0-5% |
| Organic Solvent | 0-10% |
| Defoamer | 0-5% |
| Water | up to 10%. |

29. The liquid composition as defined in claim 12, wherein said emulsion compound includes latex emulsion, said latex emulsion constituting about 5-25 volume percent of said aqueous asphalt mixture.

30. The liquid composition as defined in claim 29, wherein said latex emulsion constituting about 8-20 volume percent of said aqueous asphalt mixture.

* * * * *